(12) United States Patent
Narasimhan et al.

(10) Patent No.: US 10,349,242 B2
(45) Date of Patent: Jul. 9, 2019

(54) CALIBRATION OF WIRELESS NETWORK'S SIGNAL STRENGTH MAP DATABASE FOR INDOOR LOCATING TECHNIQUES

(71) Applicant: HEWLETT PACKARD ENTERPRISE DEVELOPMENT LP, Houston, TX (US)

(72) Inventors: Partha Narasimhan, Saratoga, CA (US); Anupam Wadhawan, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/029,846

(22) Filed: Jul. 9, 2018

(65) Prior Publication Data
US 2018/0317065 A1    Nov. 1, 2018

Related U.S. Application Data

(63) Continuation of application No. 14/691,760, filed on Apr. 21, 2015, now Pat. No. 10,021,529.

(51) Int. Cl.
*H04W 24/00* (2009.01)
*H04W 4/33* (2018.01)
(Continued)

(52) U.S. Cl.
CPC ............ *H04W 4/33* (2018.02); *H04B 17/318* (2015.01); *H04W 4/04* (2013.01)

(58) Field of Classification Search
CPC ... H04W 52/245; H04W 17/318; H04W 4/04; H04W 24/00; H04W 4/33; H04W 48/16; H04W 48/20
(Continued)

(56) References Cited

U.S. PATENT DOCUMENTS

| 7,864,736 B2 | 1/2011 | Yashar et al. |
| 8,401,554 B2 | 3/2013 | Melkote et al. |

(Continued)

FOREIGN PATENT DOCUMENTS

JP    6209774 B2 * 10/2017

OTHER PUBLICATIONS

English Translation of JP3209774B2 Oct. 29, 2018.*

*Primary Examiner* — William D Cumming
(74) *Attorney, Agent, or Firm* — Hewlett Packard Enterprise Department

(57) ABSTRACT

Provided are devices, computer-program products, and methods for calibration of a signal strength map for purposes of providing wireless positioning services through fingerprinting. Fingerprinting involves generating a map of the signal strengths in an area covered by a Wi-Fi network. In some implementations, a wireless probe request may be received. In these implementations, the wireless probe request may be associated with location information. In some implementations, the signal strength of the wireless probe request may be detected. In these implementations, the signal strength may indicate a signal characteristic between an origination and a destination for the wireless probe request. In some implementations, the wireless probe request may be responded to with a response message. In these implementations, the response message may include the signal strength of the wireless probe request. In these implementations, the response message and the location information may further facilitate generating an entry in a fingerprinting database.

20 Claims, 13 Drawing Sheets

(51) Int. Cl.
*H04W 48/16* (2009.01)
*H04W 48/20* (2009.01)
*H04W 4/04* (2009.01)
*H04B 17/318* (2015.01)

(58) Field of Classification Search
USPC .................................. 455/456.6; 370/336
See application file for complete search history.

(56) References Cited

U.S. PATENT DOCUMENTS

| | | | |
|---|---|---|---|
| 8,437,275 B2 | 5/2013 | Banerjee et al. | |
| 8,655,278 B2 | 2/2014 | Laroche et al. | |
| 8,699,418 B2 | 4/2014 | Iyer et al. | |
| 9,161,293 B2 | 10/2015 | Choudhary et al. | |
| 9,445,226 B2 * | 9/2016 | Castagnoli | H04W 4/02 |
| 9,491,583 B2 * | 11/2016 | Venkatraman | H04W 4/04 |
| 9,655,038 B2 | 5/2017 | Kapoor | |
| 9,742,481 B1 | 8/2017 | Jorgovanovic | |
| 9,936,391 B2 * | 4/2018 | Bhanage | H04W 16/00 |
| 10,021,529 B2 * | 7/2018 | Narasimhan | H04B 17/318 |
| 10,225,775 B2 * | 3/2019 | Townend | H04W 48/20 |
| 2007/0021126 A1 | 1/2007 | Nanda et al. | |
| 2008/0032727 A1 | 2/2008 | Stephenson et al. | |
| 2011/0183683 A1 | 7/2011 | Das et al. | |
| 2012/0275320 A1 | 11/2012 | Iyer | |
| 2013/0136018 A1 | 5/2013 | Jeong et al. | |
| 2014/0119337 A1 | 5/2014 | Peng et al. | |
| 2014/0211716 A1 | 7/2014 | Iyer | |
| 2015/0004903 A1 | 1/2015 | Lyman | |
| 2015/0219742 A1 * | 8/2015 | Castagnoli | H04W 4/02 370/336 |
| 2015/0281908 A1 * | 10/2015 | Venkatraman | H04W 4/04 455/456.6 |
| 2016/0227473 A1 * | 8/2016 | Bhanage | H04W 16/00 |
| 2016/0316342 A1 * | 10/2016 | Narasimhan | H04B 17/318 |
| 2017/0013560 A1 * | 1/2017 | Ruan | H04W 52/245 |
| 2017/0126477 A1 | 5/2017 | Ponnuswamy | |
| 2017/0339728 A1 | 11/2017 | Lee | |
| 2018/0213406 A1 * | 7/2018 | Bhanage | H04W 16/00 |
| 2018/0317065 A1 * | 11/2018 | Narasimhan | H04B 17/318 |

* cited by examiner

CALIBRATION OF WIRELESS NETWORK'S SIGNAL STRENGTH MAP DATABASE FOR INDOOR LOCATING TECHNIQUES

CROSS REFERENCE TO RELATED APPLICATION

This application is a continuation of co-pending U.S. patent application Ser. No. 14/691,760, filed Apr. 21, 2015, the entire contents of which are hereby incorporated by reference as though fully set forth herein.

SUMMARY

Provided are devices, computer-program products, and methods (e.g., computer-implemented methods) for calibration of a signal strength map for purposes of providing wireless positioning services through fingerprinting. Fingerprinting involves generating a map of the signal strengths in an area covered by a Wi-Fi network. The signal strength map may be used by the network to locate the position of a client device that is within the area. Devices, computer-program products, and methods for calibration of the signal strength map are disclosed. In some implementations, a wireless probe request may be received. In these implementations, the wireless probe request may be associated with location information. In some implementations, the signal strength of the wireless probe request may be detected. In these implementations, the signal strength may indicate a signal characteristic between an origination and a destination for the wireless probe request. In some implementations, the wireless probe request may be responded to with a response message. In these implementations, the response message may include the signal strength of the wireless probe request. In these implementations, the response message and the location information may further facilitate generating an entry in a fingerprinting database.

In some implementations, computing devices may be indoor computing devices. In these implementations, the wireless probe request may be sent from an indoor location. In some implementations, the response message may include an identity of a computing device.

In some implementations, an additional wireless probe request may be received. In these implementations, the additional wireless probe request may be associated with different location information. In some implementations, the signal strength of the additional wireless probe request may be detected. In these implementations, the additional detected signal strength may indicate an additional signal characteristic that is different from the signal characteristic detected for the first wireless probe request. In some implementations, the additional wireless probe request is responded to with an additional response message. In these implementations, the additional response message includes the additional detected signal strength. In these implementations, the additional response message and the different location information may further facilitate generating and entry in the fingerprinting database.

In some implementations, the wireless probe request may include a unique identifier. In these implementations, the unique identifier may correspond to the wireless probe request. Further, in these implementations, the response message may include the unique identifier.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that although the present system and methods have been specifically disclosed by embodiments and optional features, modification and variation of the concepts herein disclosed may be resorted to by those skilled in the art, and that such modifications and variations are considered to be within the scope of the systems and methods as defined by the appended claims.

BRIEF DESCRIPTION OF THE DRAWINGS

Illustrative embodiments are described in detail below with reference to the following figures.

DETAILED DESCRIPTION

Provided are systems and methods for generating a signal strength map for purposes of providing wireless positioning services. Specifically, provided is a method for the calibration phase of fingerprinting.

Computing networks may provide various services and protocols that allow client devices to find out information about the network and/or about the client devices themselves. For example, when client devices connect to a network, they are typically assigned a numerical address that uniquely identifies the client device to the network, usually called an Internet Protocol (IP) address. In some cases, a client device may not know its own IP address for various reasons; for example, the client device's hardware or software may not make the IP address available. In such cases, the client device can query the network, and the network will return a response containing the IP address. As another example, the network may include various services, such as printing or display services, that are available to client devices connected to the network. Client devices may query the network to find out what services are provided, or may ask if a specific service is provided. As another example, the network may provide location services to client devices.

Location services provide a client device with the ability to determine the client device's geographic location. A common type of location service is provided by the Global Positioning System (GPS). GPS uses extra-terrestrial satellites to determine a client device's position; however, GPS is not available everywhere or to every a device. GPS functions particularly poorly indoors, where satellite transmissions have difficulty reaching. Moreover, not every client device is GPS-enabled; GPS is only available to client devices that include a GPS antenna. Even when a client device is capable of GPS functions, on many client devices GPS must be turned on by the user in order to operate.

Indoor location services may be provided by making use of Wi-Fi signals. Wi-Fi signals may be provided indoors to provide wireless network connectivity for wireless-enabled client devices. Existing Wi-Fi systems can also be used to provide location services. Various Wi-Fi-based positioning systems exist. One such system is "fingerprinting." Fingerprinting involves generating a map of the signal strengths in an area covered by a Wi-Fi network. The signal strength map may then be used by the network to locate the position of a client device that is within that area.

Discussed below are example networks for providing location services. Discussed thereafter are various protocols and methods by which a client device can request information from the network. Then discussed is the operation of fingerprinting, and implementations generating the signal strength map. Lastly, discussed are computer systems that may be used to implement the systems and methods discussed herein.

I. Network Configurations

Figure 1:
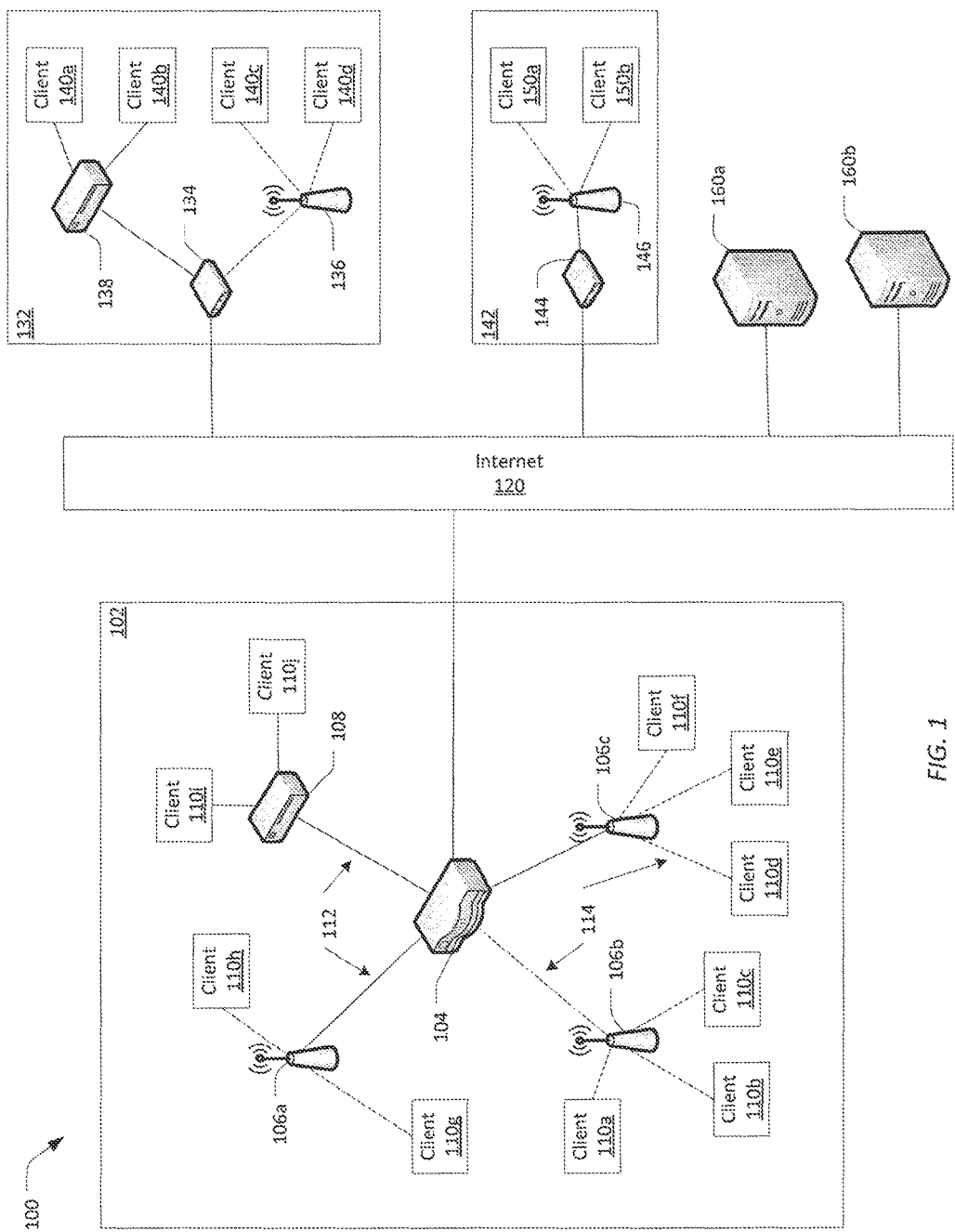
FIG. 1 illustrates one embodiment of a network configuration that may be implemented for a multi-user organization, such as a business, educational institution, governmental entity, or any other organization having multiple users and possibly multiple sites.

FIG. 1 illustrates one embodiment of a network configuration 100 that may be implemented for a multi-user organization, such as a business, educational institution, governmental entity, or any other organization having multiple users and possibly multiple sites. The network configuration 100 includes a main office 102 in communication with the Internet 120, and may also include one or more remote sites 132, 142 also in communication with the Internet 120. In the illustrated embodiment, the main office 102 includes a controller 104 in communication with the Internet 120. The controller 104 may provide communication with the Internet 120 for the main office 102, though it may not be the only point of communication with the Internet 120 for the main office 102. A single controller 104 is shown as an example and not a limitation. It is understood that a main office 102 may include multiple controllers and/or multiple communication points with the Internet 120.

A controller 104 may be any device that is operable to configure and manage network devices, such as at the main office 102 and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more routers 108 and/or wireless access points 106a-c. Routers 108 and wireless access points 106a-c provide network connectivity to various client devices 110a-j. Using a connection to a router 108 or access point 106a-c, a client device 110a-j is able to access network resources, including other devices on the network and the Internet 120.

Client devices 106a-c include any hardware device that includes processing circuitry running at least one process adapted to control the flow of traffic into the device. Client devices may also include user input and output interfaces and communication interfaces, such as a radio for wireless communication and/or a physical connector for a wired communication. Examples of client devices include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions, content receivers, set-top boxes, personal digital assistants (PDAs), mobile phones, smart phones, smart terminals, dumb terminals, virtual terminals, video game consoles, and the like.

Within the main office 102, a router 108 is included as one example of a point of access to the network for wired client devices 110i-j. Client devices 110i-j connect to the router 108 and are able to access the network, including the Internet 120, through the router 108. Client devices 110i-j may communicate with the router 108 over a wired 112 connection. In the illustrated example, the router 108 communicates with the controller 104 over a wired 112 connection. Routers may also act as a point of access to the network for wireless client devices.

Wireless access points 106a-c are included as another example of a point of access to the network for client devices 110a-h. An access point 106a-c is a combination of hardware, software, and/or firmware that is configured to provide wireless network connectivity to wireless client devices 110a-h. In the illustrated embodiment, the access points 106a-c can be managed and configured by the controller 104. The access points 106a-c communicate with the controller 104 over either wired 112 or wireless 114 connections.

The network configuration 100 may include one or more remote sites 132, 142. A remote site 132 may be located in a different physical or geographical location from the main office 102. In some cases the remote site 132 is in the same geographical location, or possibly the same building, as the main office, 102, but lacks a direct connection to the network located within the main office 102. A remote site 132 such as the one illustrated may comprise, for example, a satellite office. The remote site 132 may include a router, modem, or other gateway 134 for communicating with the Internet 120. The remote site 132 may also include a router 138 and/or access point 136 in communication with the gateway 134 over either wired or wireless connections. The router 138 and access point 136 provide connectivity to the network for various client devices 140a-d.

In various embodiments, the remote site 132 is in direct communication with main office 102, such that client devices 140a-d at the remote site 132 access the network resources at the main office 102 as if these clients 140a-d were located at the main office 102. In such embodiments, the remote site 132 is managed by the controller 104 at the main office, and the controller 104 provides the necessary connectivity, security, and accessibility that enable the remote site's 132 communication with the main office 102.

In various embodiments, the network configuration 100 may include one or more smaller remote sites 142, comprising only a router, modem, or other gateway 144 for communicating with the Internet 120 and a wireless access point 146, by which various client devices 150a-b access the Internet 120. Such a remote site 142 may represent, for example, an individual employee's home or a temporary remote office. The remote site 142 may also be in direct communication with the main office 102, such that the client devices 150a-b at remote site 142 access network resources at the main office 102 as if these client devices 150a-b were located at the main office 102. The remote site 142 may be managed by the controller 104 at the main office 102 to make this transparency possible.

The network configuration 100 includes the Internet 120, and thus may also include various content servers 160a-b. Content servers 160a-b may include various providers of multimedia downloadable and/or streaming content, including audio, video, graphical, and/or text content, or any combination thereof. Examples of content servers 160a-b include, for example, websites, streaming radio and video providers, and cable and satellite television providers. The client devices 110a-j, 140a-d, 150a-b may request and access the multimedia content provided by the content servers 160a-b.

Figure 2:
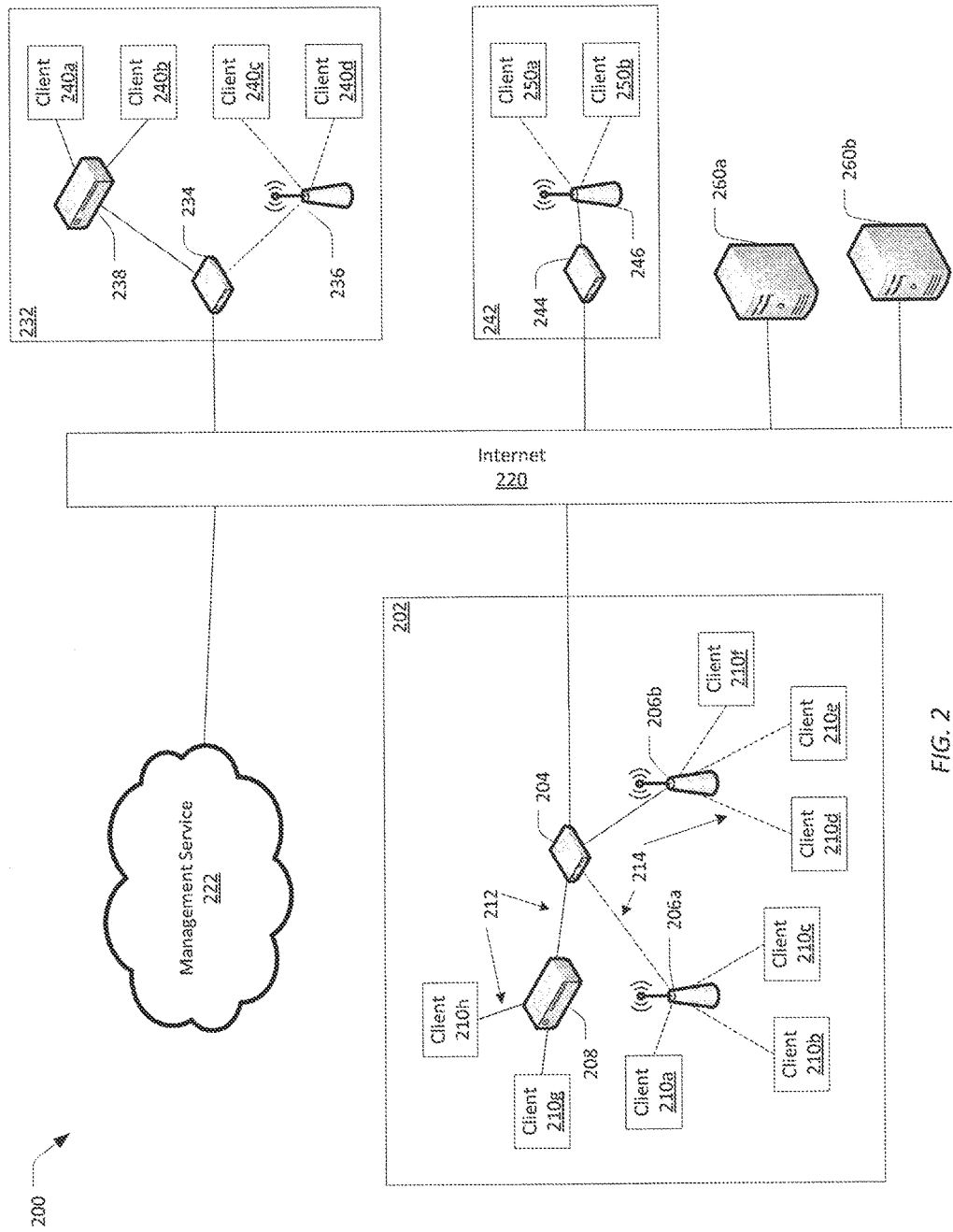
FIG. 2 illustrates an embodiment of a network configuration that includes a cloud-based management service.

FIG. 2 illustrates an embodiment of a network configuration 200 that includes a cloud-based management service 222. The network configuration 200 may be implemented for a multi-user organization. The network configuration 200 includes a main office 202 in communication with the Internet 220, and may also include one or more remote sites 232, 242, also in communication with the Internet 220. In the illustrated embodiment, the main office 202 includes a router, modem, or other gateway 204 for communicating with the Internet 220. A single gateway 204 is shown as an example and not a limitation. It is understood that a main office 202 may include multiple gateways and/or multiple communication points with the Internet 220.

The gateway 204 may be in communication with one or more routers 208 and/or wireless access points 206a-b. Routers 208 and access points 206a-b provide network connectivity to various client devices 210a-h. Using a connection to a router 208 or access point 206a-b, a client device 210a-h is able to access network resources, including other devices on the network and the Internet 220.

A router 208 is included as an example of a point of access to the network for client devices 210g-h. Client devices 210g-h may communicate with the router 208 over a wired 212 connection. Wireless access points 206a-b are included as another example of a point of access to the network for client devices 210a-f. Client devices 210a-f may communicate with the access points 206a-b over wireless 214 connections. The access points 206a-b may themselves communicate with the gateway 204 over either wired 212 or wireless 214 connections.

In some embodiments, the network configuration 200 may include a cloud-based management service 222. The management service 222 may include various software and software processes for managing the network at the main office 202. Management tasks may include, for example, access, authentication, security, hardware management, and/or internal and/or external communication. The management service 222 may be running on a server local to the main office 202, or a server located remotely from the main office 202, or may be distributed across any number of local and/or remote servers. In embodiments where the management service 222 is located remote to the main office 202, the management service 222 may access the main office 202 over the Internet 220.

The network configuration 200 may include one or more remote sites 232, 242. A remote site 232 may include a gateway 234 for communicating with the Internet 220. The remote site 232 may also include a router 238 and/or access point 236 in communication with the gateway 234 over either wired or wireless connections. The router 238 and access point 236 provide connectivity to the network for various client devices 240a-d.

In various embodiments, the remote site 232 may be managed by the management service 222, such that client devices 240a-d at the remote site 232 access the network resources at the main office 202 as if these clients 240a-d were located at the main office 202. The management service 222 provides the necessary connectivity, security, and accessibility that enable the remote site's 232 communication with the main office 202.

In various embodiments, the network configuration 200 may also include one or more smaller remote sites 242, comprising only a gateway 244 for communicating with the Internet 220 and possibly a wireless access point 246, by which various client devices 250a-b access the Internet 220. The remote site 242 may also be managed by the management service 222, such that the client devices 250a-b at the remote site 242 access network resources at the main office 202 as if these client devices 250a-b were located at the main office 202. The management service's 222 control over the remote site 242 makes this transparency possible.

The network configuration 200 includes the Internet 220, and thus may also include various content servers 260a-b. The client devices 210a-h, 240a-d, 250a-b may request and access multimedia content provided by the content servers 260a-b.

Network configurations 100, 200, as illustrated in FIGS. 1 and 2, may provide various services or protocols that allow client devices to find out information about the network and/or about the client devices themselves. For example, when client devices connect to a network, they are typically assigned a numerical address that uniquely identifies the client device to the network, usually called an Internet Protocol (IP) address. In some cases, a client device may not know its own IP address for various reasons; for example, the client device's hardware or software may not make the IP address available. In such cases, the client device can query the network, and the network will return a response containing the IP address. As another example, the network may include various services, such as printing or display services, that are available to client devices connected to the network. Client devices may query the network to find out what services are provided, or may ask if a specific service is provided. As another example, the network may provide location services. In such cases, a client device may be able to request the client device's geographic location from the network. Various methods for querying the network for these types of information are discussed below.

II. Finding Information about the Network

In some implementations, when a client device joins a network, such as the networks illustrated in FIGS. 1 and 2, the client device may want to find out certain information about the network or even about itself. The network may provide services or protocols that the client device can use to ask for this information. One such protocol is multicast Domain Name System (mDNS). mDNS provides a way for client devices to resolve host names to IP addresses when a network does not include a local name server. A host name is a string or phrase assigned to a network device to identify the device (e.g. "Office_Printer"). A host name is distinguishable from an IP address, which is a numerical address for the network device (e.g. "192.168.10.1"). A name server is a network device or software running on the network that translates host names to IP addresses. The name server maintains a list of available IP addresses, and responds to queries from client devices to look up IP addresses for host names.

Figure 3A:
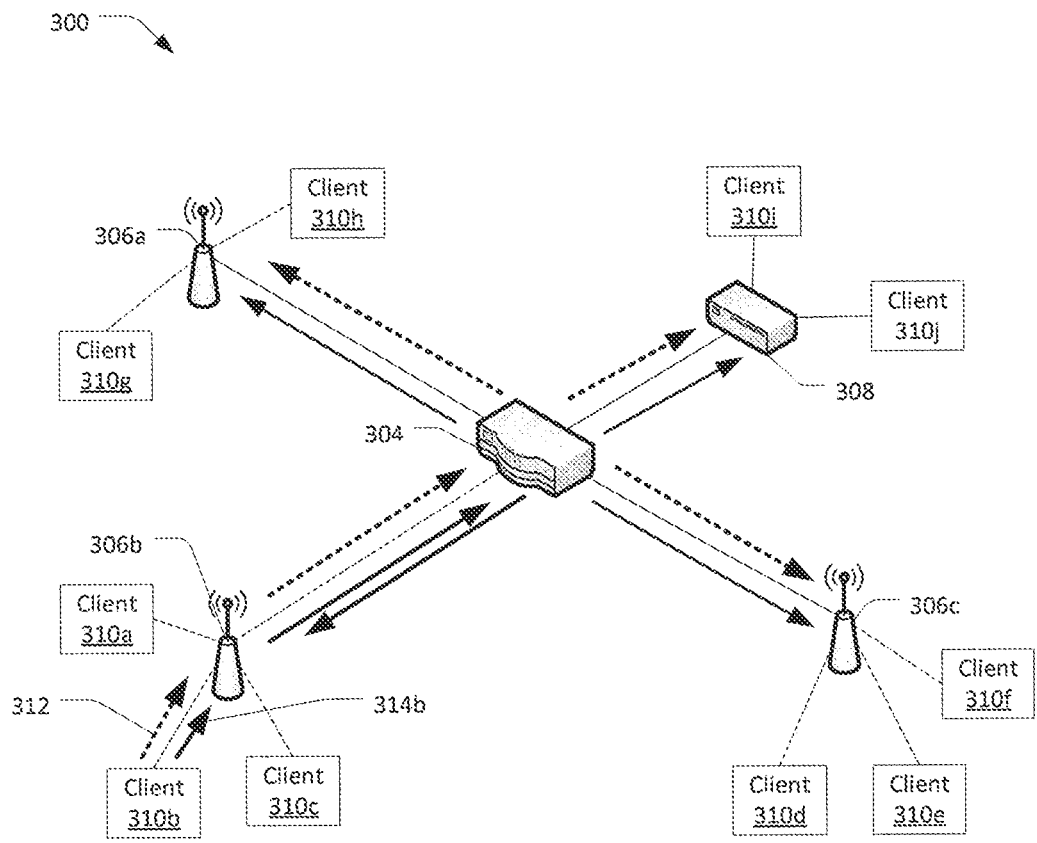
FIG. 3A illustrates one example of a client device using mDNS to determine its own IP address.

Some networks, however, do not include a name server. In such networks, client devices may use mDNS to find the IP addresses of devices attached to the network, including the client device's own IP address. FIG. 3A illustrates one example of a client device 310b using mDNS to determine its own IP address. FIG. 3A illustrates a small network 300, which may be part of the network configurations 100, 200 illustrated in FIGS. 1 and 2. The small network 300 of FIG. 3A may be a sub-network, or "subnet," of a larger network, as illustrated in FIGS. 1 and 2. Subnets maintain their own set of IP addresses that are unique within the subnet. The small network 300 illustrated in FIG. 3A includes a controller 304, access points 306a-c, a router 308, and various client devices 310a-j. The access points 306a-c provide wireless network access to client devices 310a-h. The client devices 310a-h are capable of connecting to the network 300 wirelessly. The router 308 provides wired connectivity for wired client devices 310i-j. The controller 304 may provide centralized control of the small network 300, and may also provide connectivity to other networks, including the Internet.

In the example illustrated in FIG. 3A, the client device 310b wants to find out its own IP address. The client device 310b may be making this query because its hardware or operating system does not provide visibility to the IP address that has been assigned to the client device 310b. To make the query, the client device 310b sends an IP multicast message 312 (illustrated with dotted arrows), asking the network device having a certain host name to identify itself. This query message 312 is typically sent as a User Datagram Protocol (UDP) packet. Because the query message 312 is multicast, it is sent to all devices on the network 300. The target of the message 312, here the client device 310b itself, may respond with a multicast message 314b (indicated with a solid arrows), that includes its IP address. The client device 310b will receive the response message 314b and thus acquire the information it sought. Since this response message 314b may also be multicast, all the devices on the network may receive the response message 314b, and may update their local IP address directories. mDNS is typically implemented only on small networks or subnets, though it may also be implemented in larger private networks and/or larger networks typically with some form of security controls.

FIG. 3A illustrates an example of a single mDNS query where the first response the client device 310b receives is likely adequate. For example, the client device 310b may have requested the IP address of any available access point 306a-c. It may be that any available access point 306a-c will do, so the client device 310b can accept the quickest response it receives, and ignore any additional responses. In other situations, the client device 310b may be looking for multiple responses, and/or may want to update responses it received earlier. For example, the client device 310b may be asking for all the printer devices available on the network 300. The printer devices available may change, and the client device 310b may thus want to occasionally update its local list of printer devices.

Figure 3B:
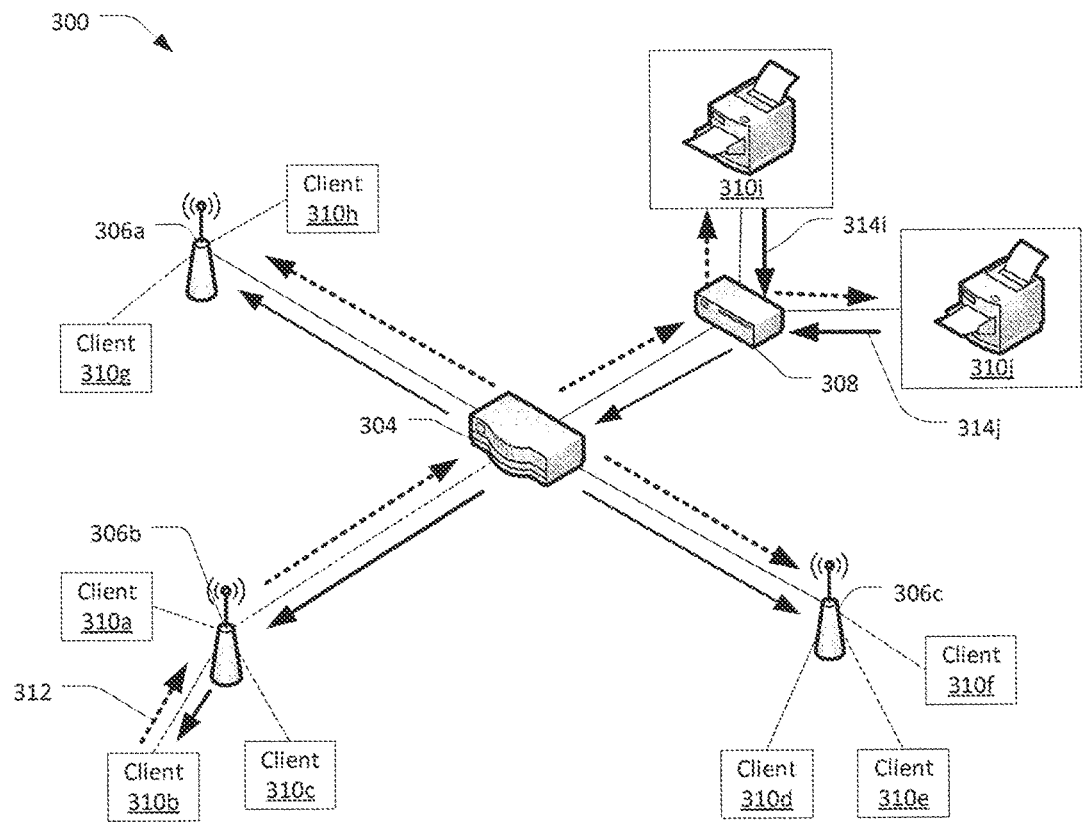
FIG. 3B illustrates an example of a client device requesting information for which multiple network devices may respond.

FIG. 3B illustrates an example of a client device 310b requesting information for which multiple network devices may respond. In this example, the client device 310b may be attempting to discover all available network-attached printers, and not only the quickest to respond. To find all available network-attached printers, the client device 310b sends an IP multicast message 312 (illustrated with dotted arrows), asking the network for any printers to identify themselves. Because the query message 312 was multicast, it may be received by all devices within hearing range on the network. In this example, the client devices 310i and 310j are network-attached printers. The client devices 310i and 310j will both send response messages 314i, 314j. Assuming that none of the other client devices 310a-h are printer devices, these are the only response messages that will be generated. The client device 310b will receive the response messages 314i, 314j and update its local directory of available printers. Because the response messages 314i, 314j may be multicast, other devices on the network may also receive the response messages 314i, 314j, and can choose to update their own directories of available printers, or ignore the responses messages 314i, 314j.

In some situations, the client device 310b may want to provide an up-to-date list of available network attached printers to its user or users. Providing an up-to-date list accommodates, for example, printers going offline and/or being added to the network 300. In such cases, the client device 310b may continuously query the network, issuing mDNS queries 312 at constant or varying intervals. Several mechanisms may exist to avoid burdening the network 300 with query 312 and response 314 messages. For example, the delay between queries 312 may increase gradually, on the assumption that the information requested does not change frequently or may reach a static state. As another example, the responses 314 may include a value that indicates for how long the answer is valid. In such cases, the client device 310b may delay its next query 312 until the validity period has expired. As an additional example, the client device issuing the response 314 may ignore the query message 312 and not send a response 314 when the client device knows that the validity period has not yet expired.

The mDNS protocol may include other configurations and options. For example, a client device can place multiple questions within the same query message. The same result could be achieved by sending multiple query messages, but combining the questions into one query reduces the amount of traffic on the network. As another example, the client device can request that the response be sent unicast rather than multicast. Unicast responses can be used for example in situations where most of the client devices on the network already have up-to-date information, and only one client device—for example, one that has just joined the network—may want to obtain updated information about the network.

mDNS provides client devices the ability to resolve host names to IP address, but only if the client device already knows the names of the devices it is looking for. mDNS does not provide information about the types of devices attached to the network, or the status of those devices. For example, with mDNS, a client device can ask "give me the addresses of display devices 'tv,' 'monitor', and 'tablet'" but is not able to ask "are there any display devices?" Separate protocols, which can collectively be called service discovery protocols, provide client devices with the ability to discover available services by type.

One such service discovery protocol, DNS-Based Service Recovery (DNS-SD), like mDNS, is also based on DNS information. In the DNS-SD protocol, DNS resource records are named and structured to facilitate service discovery within a given network. Given a type of service that a client device is looking for, DNS-SD allows the client devices to discover a list of named instances of the desired service, using standard DNS queries. DNS-SD can be implemented in a network that does not include a name server (i.e., a network using mDSN) or a network that does include a name server.

DNS-SD relies on DNS-based standards, including service records (usually called SRV records) and text records (usually called TXT records), each of which are a type of resource record. DNS-SD further relies on standard resource record queries and uses them in a slightly different way than is defined by the DNS standard.

Figure 3C:
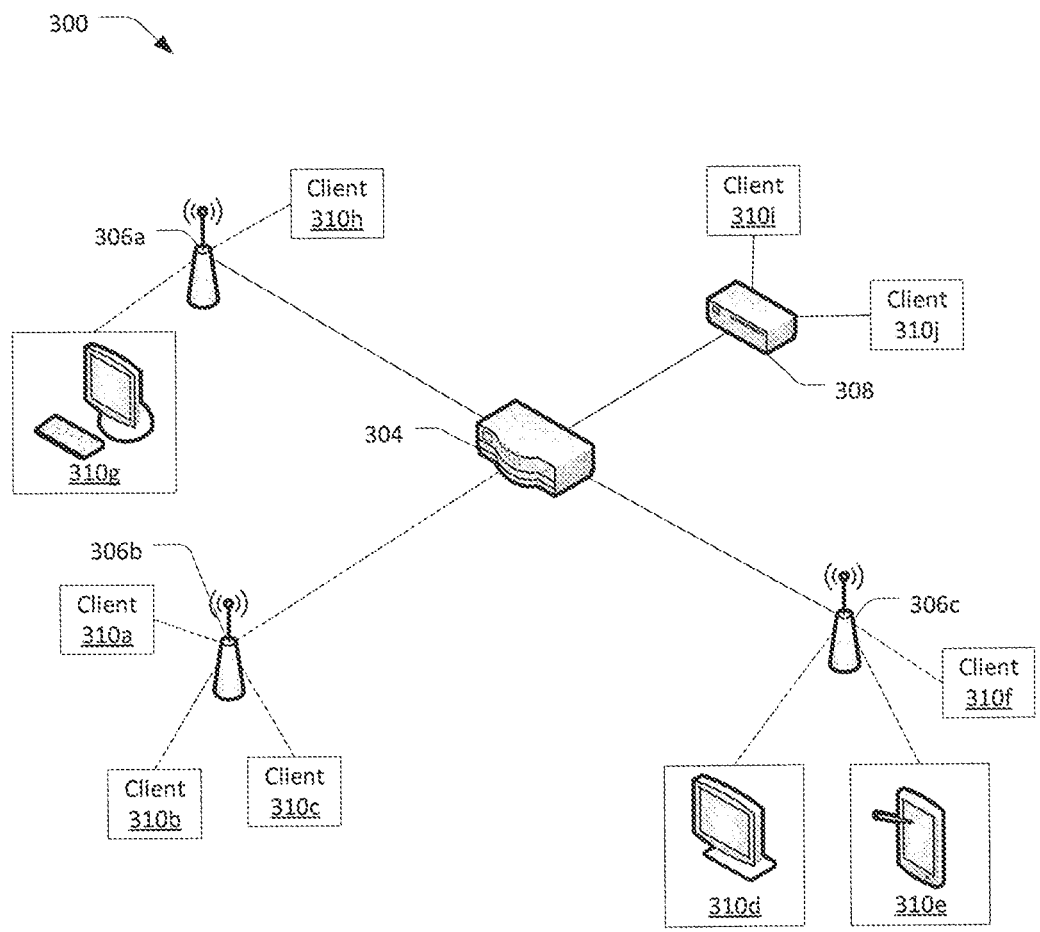
FIG. 3C illustrates one example of a client device asking the network 300 for a list of all network devices that provide a particular service.

FIG. 3C illustrates one example of a client device 310*b* asking the network 300 for a list of all network devices that provide a particular service. In this example, the client devices 310*d*, 310*e*, and 310*g* are different kinds of display devices (e.g., a large television, a desktop monitor, a tablet computer, etc.). Each of these client devices 310*d*, 310*e*, and 310*g* have an SRV record that states the services provided by these client devices. For example, the SRV record for the client device 310*d* may give "_tv._display.example.com;" "_tv" is the name of a specific instance of the service, "_display" is the name of the service, and "example.com" is the name of the network 300 (in this example, the name of the network 300 is similar to a domain name). Similarly, the SRV record for the client device 310*e* may be "_monitor._display.example.com". The TXT record for each of these client devices 310*d*, 310*e*, 310*g* gives additional information about each instance, where the information is typically arranged as key/value pairs. Additional information may include, for example, available screen resolutions and other display options for display devices, or paper sizes and other printing options for printer devices.

Through SRV records, the DNS standard provides a way for client devices to identify the services they provide. To find services available on the network 300 using standard DNS resource record retrieval requests, the client device 310*b* may ask for resource records of the type "SRV" for SRV records. To find an SRV record, however, the client device 310*b* has to specify the full name of the SRV record (e.g. "_tv._display.example.com"). In contrast, DNS-SD provides a way to ask for SRV records using only a type name. To do so, DNS-SD uses the existing DNS "PTR" or "pointer" record type. A PTR record points from one name to some other location within the network 300. For example, one or more PTR records may be maintained with the name "_display.example.com," where each PTR record points to a specific instance of a client device providing display services. In the example of FIG. 3C, three PTR records may exist, each with the name "_display.example.com", one each for the instances "_tv._display.example.com," "_monitor._display.example.com," and "_tablet._display.example.com." The client device 310*b* can query the DNS database for the PTR record "_display.example.com" and receive three answers, which it can then use to update its local directory of available display devices. The associated TXT records then provide the client device 310*b* with additional information about each display device, such as configuration parameters.

As illustrated in FIG. 3C, it may not be necessary for the client device 310*b* to send query messages to the network 300. In some cases, the client device 310*b* may have its own DNS database, populated by mDNS queries. In such cases, the client device 310*b* can look into its own DNS database for the PTR records. The client device 310*b* may also first send mDNS queries to update its DNS database. Alternatively or additionally, the client device 310 may send mDNS queries to ask the network to provide the desired PTR records. In other cases, the network 300 may include a DNS name server. In such cases, the client device 310*b* can ask the name server for the PTR records.

DNS-SD is given as an example of a service discovery protocol. Other service discovery protocols exist that may rely on similar or different mechanisms. Other service discovery protocols include, for example, Simple Service Discovery Protocol (SSDP) and Service Location Protocol (SLP).

mDNS and DNS-SD are given as examples of protocols client devices can use to obtain information when connected to a small, localized network such as the network 300 illustrated in FIGS. 3A-3C. Other query and response protocols and methods exist not only to provide the client device information, but also for the network itself to obtain information that the network can then provide to the client device. A group of such protocols and methods provide Wi-Fi-based positioning for client devices.

III. Wi-Fi-Based Positioning Using Fingerprinting

Wi-Fi-based positioning systems (WPS or WiPS or WFPS) are systems and methods that provide location services to client devices. Wi-Fi positioning provides similar information as is provided by the Global Positioning System (GPS); that is, Wi-Fi positioning allows a client device to determine where, geographically, the client device is located. Wi-Fi positioning may also provide location information for client devices that do not have a GPS receiver but do have Wi-Fi antennas. Wi-Fi positioning may be provided where GPS may function poorly, such as indoors. Wi-Fi positioning is generally provided within a limited area covered by wireless communication signals that are provided by a network of related devices. Network devices are related when they are aware of each other and are likely connected to the same network. The same area may be covered by multiple networks of related devices, and each network may separately provide location services.

Several different methods exist for determining a client device's location based on Wi-Fi signals. One of the more popular methods is "fingerprinting," also called fingerprinting-based indoor localization, or fingerprint matching. Fingerprinting involves collecting signal information (a fingerprint) about an area and storing the information in a database. The location of a client device can then be determined by matching signal information related to the client device with entries in the database.

Figure 4A:
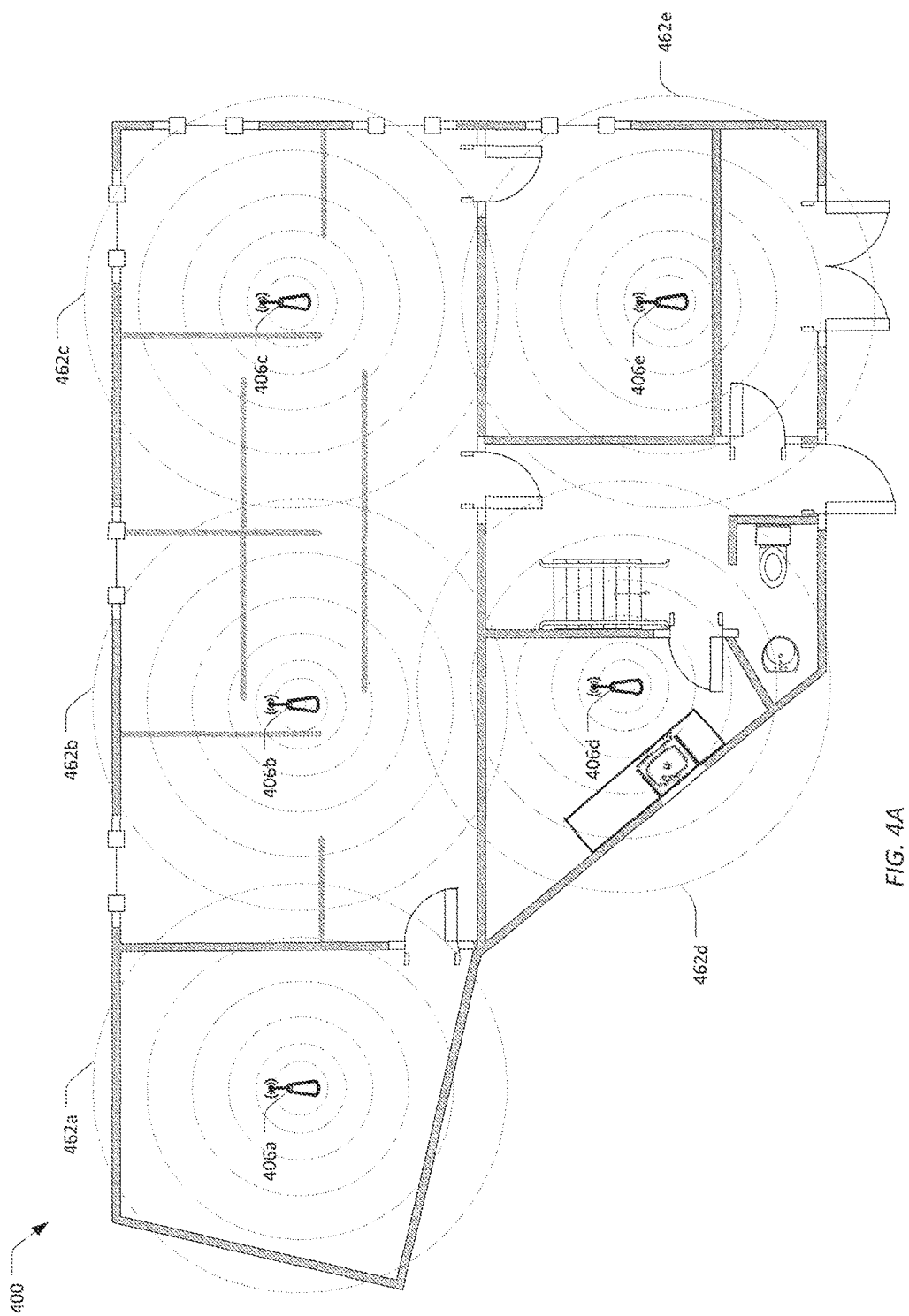
FIG. 4A provides an example of a floor of a building that is to provide Wi-Fi-based positioning services.

FIG. 4A provides an example of a floor 400 of a building that is to provide Wi-Fi-based positioning services. The floor 400 may be within, for example, an office building or a university research facility. The floor 400 may include walls, doors, windows, furniture, fixtures, computer and other electronic equipment, networking equipment, and people. The floor 400 is provisioned with a number of access points 406*a*-406*e* positioned at various locations across the floor 400. The access points 406*a*-406*e* may connect to the same network, and thus may form part of a related network.

Each access point's 406*a*-406*e* antenna or antennas have an effective range 462*a*-462*e*. For transmissions by the access point 406*a*-406*e*, the farther the transmit signal is from the transmitting access point 406*a*-406*e*, the weaker the signal becomes. For receiving, the farther away the origin of the received signal, the weaker the signal received by the access point 406*a*-406*e*. Additionally, signals to and from the access points 406*a*-406*e* may bounce off of walls or objects, and/or may lose strength when passing through walls or objects. The access points 406*a*-406*e* may be spatially distributed across the floor 400 so that their effective ranges 462a-462e overlap. In this way access to wireless communication may be provided to all significant points across the floor 400.

The network of access points 406a-406e may be used to provide fingerprinting-based location services. Fingerprinting involves two phases. The first phase may be referred to as the calibration, training, or offline phase. During the first phase, signal information is collected and stored in a database. The second phase may be referred to as the positioning, localization, or online phase. During the second phase, the fingerprinting database is used to provide a client device with its current location.

Figure 4B:
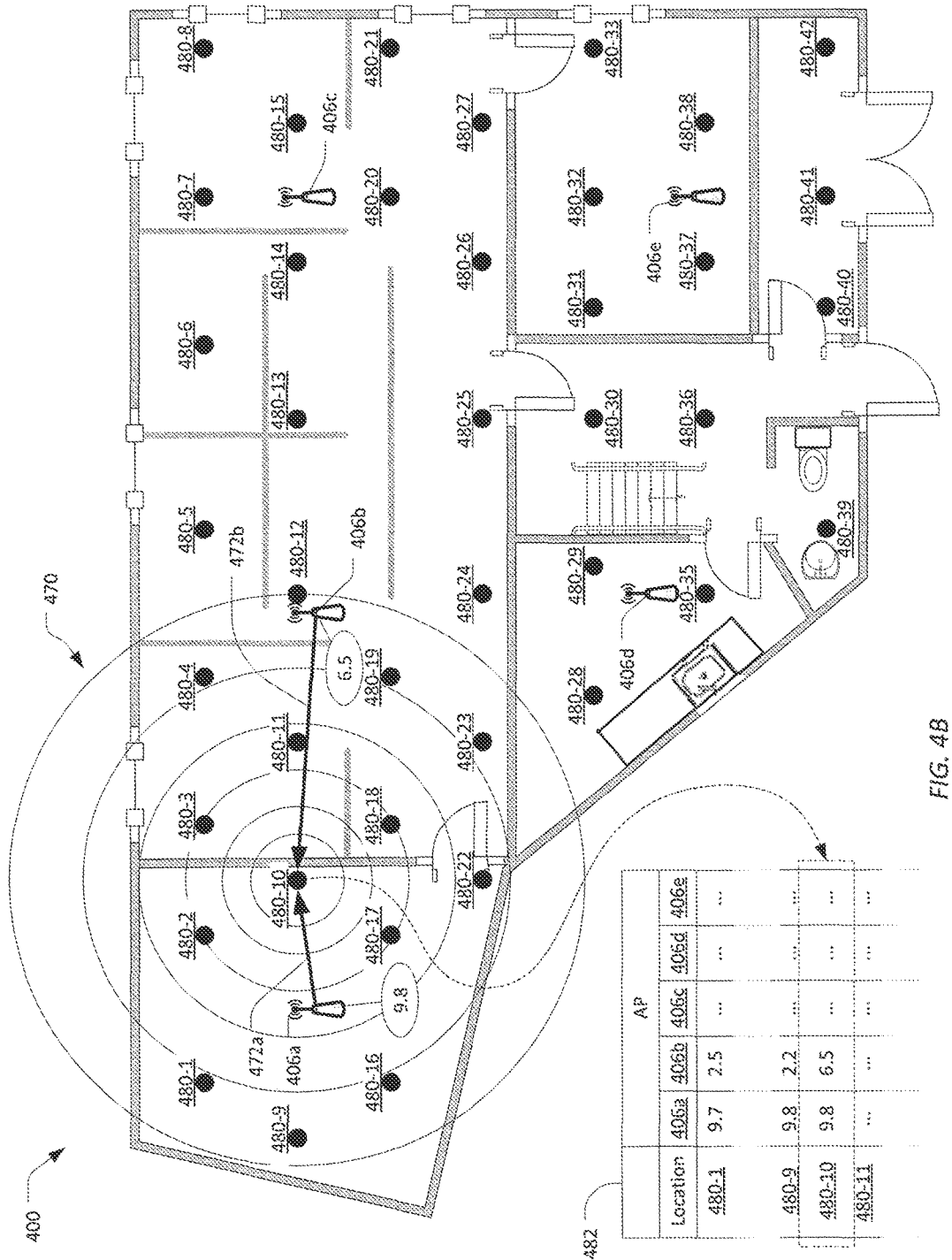
FIG. 4B illustrates a first example of the calibration phase for generating a fingerprinting database.

FIG. 4B illustrates a first example of the calibration phase. During the calibration phase, a radio map 482 of the floor 400 is generated. A radio map 482 is a database of predefined points and radio signal characteristics for each of those points. The radio map 482 may also be referred to herein as the fingerprinting database. As illustrated in FIG. 4B, various points 480-1 through 480-42 have been designated across the floor 400. While the points 480-1 through 480-42 have been placed in the illustrated example in a loose grid, the points 480-1 through 480-42 need not be placed in a grid. The points 480-1 through 480-42 can be placed in any convenient or relevant (e.g., where client devices are expected to be) manner. Furthermore, fewer or more points may be defined. The number of points defined may be determined by, for example, the density or distance between the access points 406a-e, the shape of the floor 400, and/or the degree of positioning accuracy that is to be provided.

The points 480-1 through 480-42 are pre-defined, and thus known, locations. The points 480-1 through 480-42 may be labeled by a geographic indicator, such as latitude and longitude or a street address. Alternatively or additionally, the points 480-1 through 480-42 may be labeled by a string describing the location (e.g., "Office 123 at Business Co."). Alternatively or additionally, the points 480-1 through 480-42 may be labeled by an arbitrary identifier (e.g., "point 480-10") that may be mapped to a location that can be understood by a client device and/or its users.

During the calibration phase, the radio signal characteristics at each point 480-1 through 480-42 is established. The radio signal characteristics include at least a signal strength, as described in further detail below. The radio signal characteristics may include other radio signal characteristics, such as how the signal propagates between the transmitter and the receiver due to the effects of scattering, fading, power decay with distance, interference, and other physical characteristics.

To generate the radio map 482, a device, usually referred to as a probe device, is placed at each of the points 480-1 through 480-42. The probe device may be any Wi-Fi-capable device, such as a desktop computer, a laptop, a smartphone, etc. The probe device may also be a special purpose device, such as for example a laptop configured with a Unix operating system, where the operating system provides access to radio signal characteristics detected by built-in or external radio antennas (typically, device drivers may not provide access information about radio signals). A laptop with less specialized software may be used, but a smartphone with special purpose applications may also be used. In the example illustrated in FIG. 4B, the probe device has been placed at point 480-10. While located at point 480-10, the probe device records received signal strengths (RSS, also called the received signal strength indicator or RSSI). Concurrently or at some point after data collection, the probe device will create an entry in the radio map 482, where the entry contains the identity of the point 480-10 and the detected signal strength. In this example, the probe device is out of the ranges 462c-e of the access points 406c-406e, and thus only records the signal strength as related to the access points 406a and 406b. Note that the values indicated in the illustrated example are merely representative, and may not correlate with actual signal strength values.

Under the conventional calibration method, the radio map 482 is populated with the signal strength as seen from the probe device's perspective. Specifically, and in the context of the example illustrated in FIG. 4B, what this means is as follows: the probe device transmits one or more probe requests 470 while at point 480-10. These probe requests 470 are similar to the probe requests used by wireless client devices to locate available access points. These probe requests 470 may differ from other probe requests in that they may indicate to the access points 406a-406e that fingerprinting calibration is taking place. Each of the access points 406a, 406b that are within range of the probe request 470 may, upon receiving a probe request 470, issue a response message 472a, 472b. The probe device is able to detect the signal strength of each of the response messages 472a, 472b, and records signal strength of each response message 472a, 472b in the radio map 482. The probe device usually also records a network address with each detected signal strength to indicate which access point 406a, 406b sent the response message 472a, 472b that gave that signal strength. The signal strength of the response messages 472a, 472b, optionally, along with the network addresses of the access points 406a, 406b, thus uniquely identifies the point 480-10.

The conventional implementation for generating the radio map 482 uses the probe device's perspective to measure signal strength. One problem that may be seen as a result is less accurate signal strength measurement. This may be due to the variability of devices used as probe devices. Due to differences in the construction of different devices, including the size and number of antennas, different devices may detect different signal strengths for the same response message. The detected signal strength may also be affected by the direction in which the probe device was facing when it received the response messages. The detected signal strength may also be affected by the probe device's ability to accurately detect the effect of interference due to walls and objects. The accuracy of the signal strength measurement may be improved by removing the variability produced by the differences in probe devices.

The conventional implementation for generating the radio map 482 may additionally require some amount to complete, depending on the size of the floor 400. The probe device typically must remain stationary at each of the points 480-1 through 480-42 long enough to receive responses from all the access points 406a-b that are within range. Though typically access points may be required to respond to probe requests as soon as possible, for various reasons there may be some small delay before the access point can transmit a response message. The access point may, in fact, miss a first probe request and only respond to a second. Greater accuracy may be also achieved if the probe device remains stationary long enough to receive several responses from each access point 406a-b. These multiple responses can be averaged or otherwise correlated to produce a more accurate signal strength value. Depending on the size of the area that is to be mapped, the calibration phase may thus be very time consuming. Additionally, the signal characteristics within the floor 400 may change as objects and/or people within the floor 400 change or move, and thus the radio map 482 may need to be updated frequently.

In some implementations, the radio map 482 is populated with the signal strength as seen from the perspective of the access points 406a-406e. In these implementations, the probe device, while located for example at point 480-10, transmits one or more probe messages 470 as before. The access points 406a, 406b that are within range of the probe message 470 may receive the probe messages 470, and, according to the implementation, may detect the signal strength of the probe message 470. As before, the access points 406a, 406b transmit responses messages 472a, 472b to the probe device. These response messages 472a, 472b, however, include the detected signal strength of the probe message 470. The probe device itself does not need to detect the signal strength of the response messages 472a, 472b. Instead, the probe device extracts the signal strength included in the response messages 472a, 472b, and records this signal strength in the radio map 482. The probe device may also record the network addresses of the access points 406a, 406b, as before.

Using the access points' point of view of signal strengths overcomes at least some of the problems of the conventional method for populating the radio map 482. The access points provide a consistent view of signal strength, thus reducing the problems related to the variability of probe devices. This is because the access points are generally fixed in place, are designed for transmission and reception over a wide area, and, because of their fixed locations, can have an accurate idea of nearby objects or structures that cause signal interference. The radio map 482 would need to be updated when the access point configuration for the floor 400 changes, but such configuration changes generally happens infrequently. When the access point configuration for the floor 400 changes, the radio map 482 would have to be updated even using the conventional method for the calibration phase. Moreover, as will be evident in the discussion of phase two, the network infrastructure provided for the floor 400 provides location services to client devices—not the probe device—and so populating the radio map 482 with data from the network perspective should provide more accurate location services.

Figure 4C:
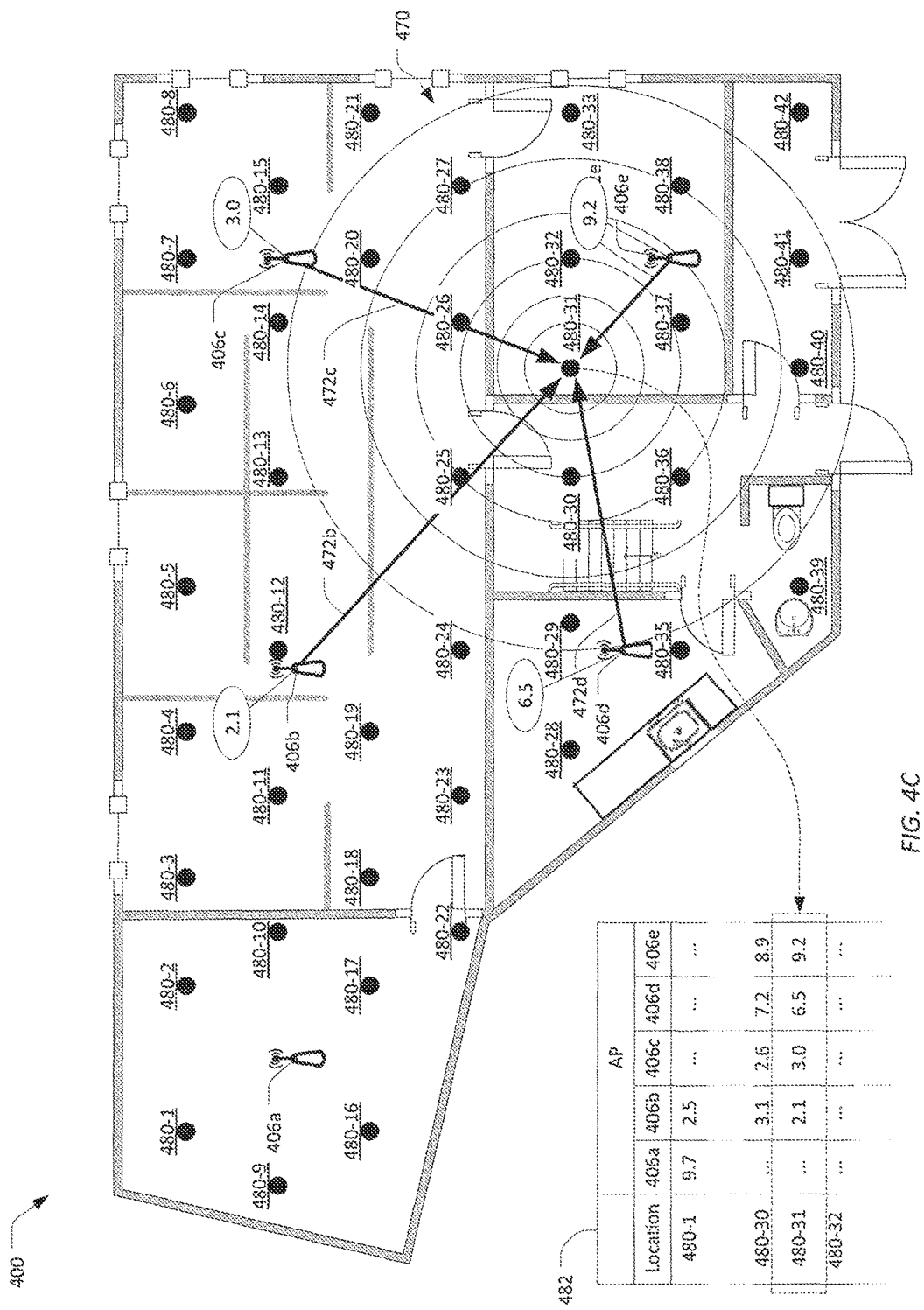
FIG. 4C provides a second example of the calibration phase.

FIG. 4C provides a second example of the calibration phase. In this example, the probe device is at point 480-31. As before, the probe device transmits one or more probe requests 470 to be received by any network entity that may be listening. At location 480-31, four access points 406b, 406c, 406d, 406e are within range, and so the probe device will receive four response messages 472b, 472c, 472d, 472e for each of its probe requests 470. Using the conventional fingerprinting calibration method, the probe device would detect and record the signal strength of each of the response messages 472b-e.

In some implementations, the access points 406b-e instead detect the signal strength of the probe request 470. Each of the access points 406b-e includes this detected signal strength in their respective response messages 472b-e. The probe device extracts the signal strength from the response messages 472b-e and records (concurrently or sometime in the future) these signal strengths in the radio map 482. The probe device itself need not detect the signal strength of the response messages. In this way, the radio map 482 is populated with signal strengths as seen from the perspective of the access points 406b-e.

Figure 4D:
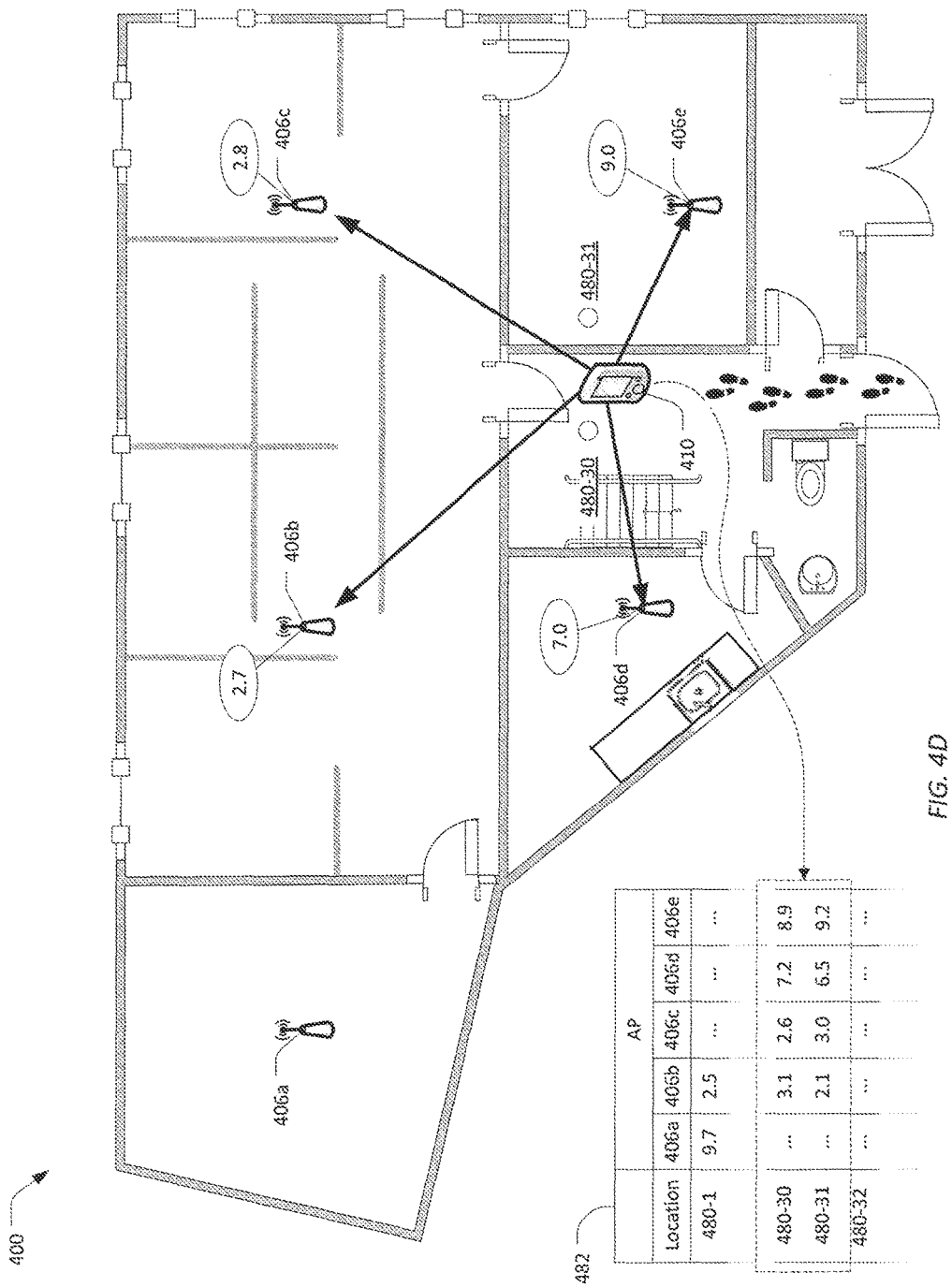
FIG. 4D illustrates an example of the second, or positioning phase of fingerprinting.

FIG. 4D illustrates an example of the second, or positioning phase of fingerprinting. In the positioning phase, the radio map 482 generated in the calibration phase is used to determine the position of any client device that is located on the floor 400. In this illustrated example, a client device 410 has entered the floor 400. This client device 410 is distinguishable from the probe device used in the calibration phase because it does not have knowledge of the points 480-1 through 480-42 defined for the calibration phase. Moreover, the client device 410 may be requesting its location while located at a position on the floor 400 that does not directly match any of the points 480-1 through 480-42. For example, in the example illustrated in FIG. 4D, the client device 410 is located between points 480-30 and 480-31, shown here in outline.

Once the client device 410 has entered the floor 400, the network servicing the floor 400 may attempt to establish the position of the client device. The network may do this at the request of the client device 410, or the network may be configured to automatically detect the client device's 410 position. To establish the client device's 410 position, the access points 406b-e that are within range of the client device detect signal strength characteristics of the client device 410. The access points 406b-e can use any transmissions by the client device 410 to measure the client device's 410 signal strength. For example, upon entering the floor 400 the client device 410 may transmit probe requests to locate available access points. The access points 406b-e may determine the signal strength of these probe requests. The network correlates the signal strengths detected by each of the access points 406b-e to the values recorded in the radio map 482. In the illustrated example, the network is able to determine, from the received signal strengths, that the client device 410 is located approximately between points 480-30 and 480-31. This position can be reported to the client device 410. If the client device 410 moves across the floor 400, the access points 406a-e can continue to measure the signal strength of transmissions from the client device 410, and thus maintain a current position for the client device 410.

Advantages provided by the calibration method that uses the access points' perspective can be seen for example in the positioning phase. As noted above, the client device's 410 position is determined by signal strengths as seen by the access points 406a-e. The calibration method also looks at signal strengths from the point of view of the access points 406a-e: the values stored in the radio map 482 are signal strengths as detected by the access points 406a-e. This calibration method thus provides a more consistent view of signal strength. This more consistent view may also achieve greater accuracy in determining the client device's 410 position.

The calibration method that uses the access points' perspective may also have the additional benefit that it can be performed somewhat faster than the conventional method. Under the conventional method for the calibration phase, the radio map 482 is populated with the signal strengths that are detected by the probe device. Signal strength is affected by factors such as the distance between the transmitter and the receiver, objects located between the transmitter and receiver, the direction of the transmission, and so on. Should the probe device move away from a designated point before receiving a response from each of the access points in range, the signal strength the probe device detects may likely be different than the value that would be measured at the designated point. The probe device must therefore remain at the designation point until it has received responses from all of the access points in range.

With the calibration method that uses the access points' perspective, the probe device need not remain stationary for as long a period of time. As will be explained in further detail below, once the probe device has transmitted its probe requests, the probe device can move away from the designated point. The access points, which are stationary, detect the signal strength of the probe requests, and will determine a similar value no matter where the probe device is located after the probe requests were sent. The probe device need only stay within the range of the access point, in order to receive the response message. Because the probe device can move after it has sent probe requests, the calibration phase may be performed somewhat faster than under the conventional method.

FIGS. 5A-5D illustrate in greater detail the interaction between the probe device and the access points during the calibration phase.

Figure 5A:
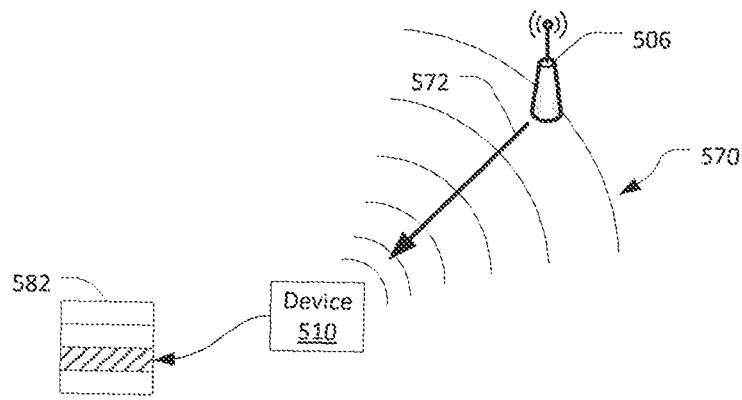
FIGS. 5A-5D illustrate in greater detail the interaction between the probe device and the access points during the calibration phase.

FIG. 5A illustrates an example of the interaction between a probe device 510 and one access point 506. The probe device 510 may interact, in the manner described below, with more than one access point at a time; however, for the sake of clarity, only one is illustrated. During the calibration phase, the probe device 510 transmits one or more probe requests 570. The probe requests 570 are similar to the probe requests used by wireless client devices to find nearby access points to associate with. Probe requests sent for purposes of finding nearby access points are targeted to any network device that may be listening for probe requests, including access points. The access points typically respond with a message that informs the client device of the access point's presence, as well as information the client device may need in order to associate with the access point.

The probe device 510 also expects one or more response messages to each of its probe requests 570. It should be noted that, although response messages are expected, they may not always be transmitted. This may be because no access points are listening for probe requests, or because the access points are configured not to respond to probe requests sent for fingerprinting calibration, or because the access point is busy, or for some other reason. Typically, however, fingerprinting calibration is conducted for a network that expects to be fingerprinted. Hence, response messages are expected.

As illustrated in FIG. 5A, the probe device 510 transmits at least one probe request 570. The access point 506 may be listening for probe requests, and upon receiving the probe request 570, or within a short time of receiving the probe request 570, will transmit a response message 572.

Under the conventional method for fingerprint calibration, the probe device 510 would detect the received signal strength of the response message 572. The probe device 510 would then store the signal strength, along with the probe device's 510 current location, in a fingerprinting database 582. The probe device 510 may also store the identity of the access point 506; typically, the identity is the network address of the access point.

In some implementations, the access point 506 detects the received signal strength of the probe request 570. The access point 506 may then include this detected signal strength in the response message 572. Upon receiving the response message 572, the probe device 510 may then extract the signal strength value from the response message 572, and store this value, along with its current location, in the fingerprinting database 582. The stored value is therefore the signal strength as seen by the access point 506, rather than the signal strength as seen by the probe device 510.

Figure 5B:
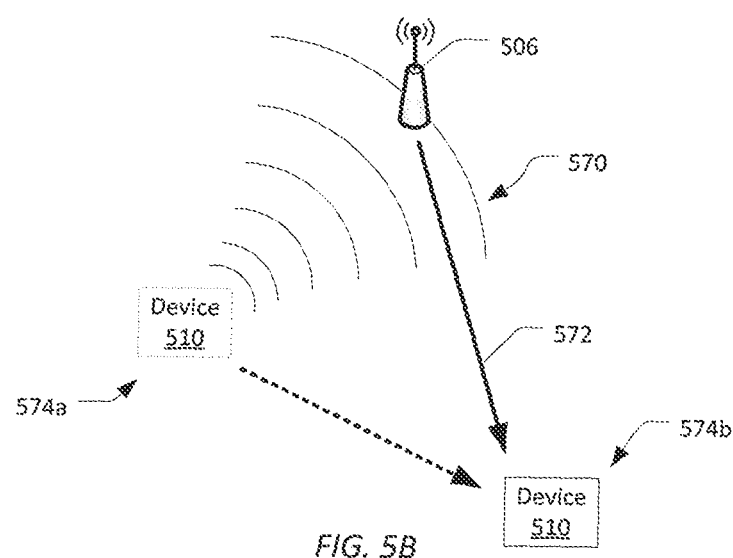

FIG. 5B illustrates at least one situation in which fingerprinting calibration that uses the access points perspective provides a more consistent, and therefore accurate, result. In FIG. 5B, the probe device 510 transmitted the probe request 570 while at a first location 574a. Before receiving the response message 572 from the access point 506, the probe device 510 moved to a second location 574b. Because the conventional method for fingerprinting calibration has the probe device 510 measure the signal strength of the response message 572, the probe device 510 will likely measure a different signal strength while at the second location 574b than it would have at the first location 574a. This may be because the second position 574b may be further from the access point 506 than the first position 574a, or because there may be different walls or objects between each location 574a, 574b and the access point 506.

Implementations of fingerprinting calibration that use the access points' perspective remove the signal strength discrepancy caused by the probe device 510 having moved to the second location 574b. Typically, the probe device 510 transmitted the probe request 570 while positioned at a pre-defined location, as discussed above. Thus the signal strength at the first location 574a is the value that should be recorded in the fingerprinting database 582. When calibrating using the access points' perspective, the access point 506 measures the signal strength of the probe request 570, where the probe request 570 was transmitted at the first location 574a. Regardless of whether the probe device 510 moves or where it moves, the probe device 510 will receive a response message 572 with the same signal strength value, that is, the signal strength with respect to the first location 574a. The probe device 510 need only stay within the range of the access point 506 so that it does not miss the response message 572.

Figure 5C:
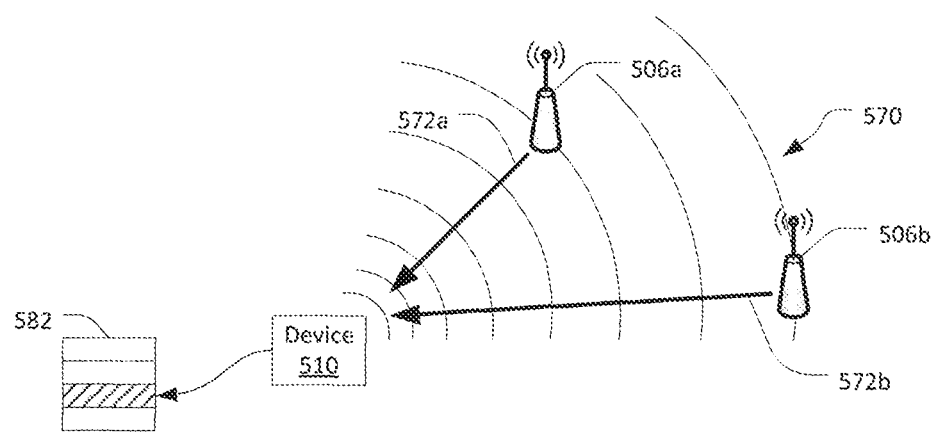

FIG. 5C illustrates an example of the probe device 510 interacting with two access points 506a, 506b. In this example, the probe device 510 transmits one or more probe requests 570. Each probe request 570 may be detected by both access points 506a, 506b. Each access point 506a, 506b will transmit a response message 572a, 572b for each probe request 570. The probe device 510 may therefore receive two response messages 572a, 572b for each probe request 570 it issued. Typically, the response messages 572a, 572b include the identity of the access point 506 that sent the response message 572a, 572b. The probe device 510 is thus able to distinguish which access point 506a, 506b each response message 572a, 572b came from. Being able to make this distinction is important because each access point 506a, 506b may have detected a different signal strength for a probe request 570. For example, in the illustrated example, the access point 506b is farther away from the probe device 510 than is the access point 506a. The access point 506b may therefore have detected a weaker signal strength than did the access point 506a. The probe device 510 may record both signal strength values in the fingerprinting database 582, both associated with the same location.

Figure 5D:
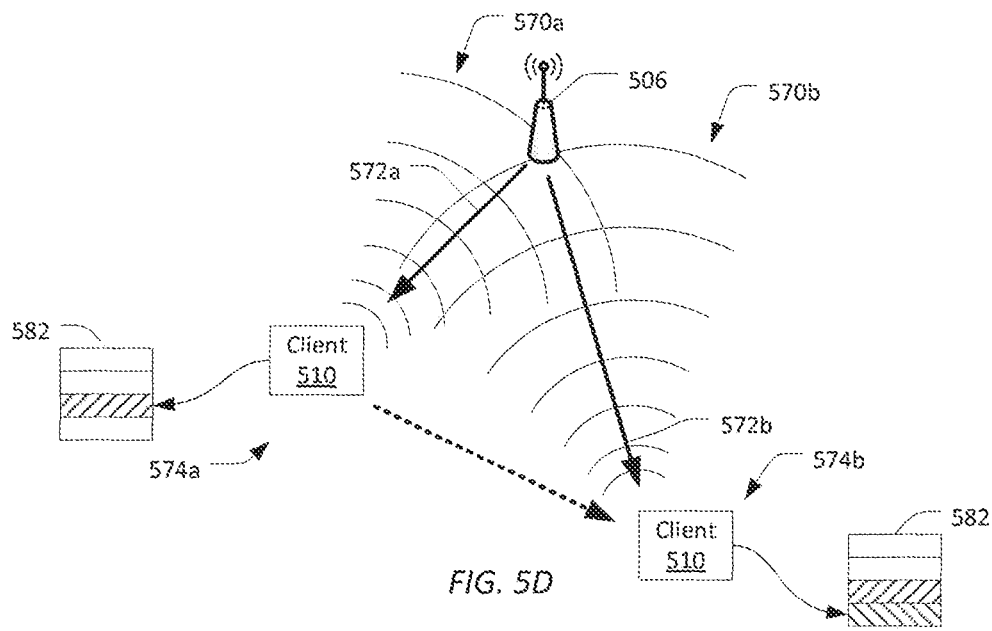

FIG. 5D illustrates an example of the probe device 510 interacting with one access point 506 when the probe device 510 changes location. Initially, the probe device 510 is positioned at a first location 574a. While at this first location 574a, the probe device may transmit one or more probe requests 570a. When calibrating using the access point's perspective, the access point 506 may detect the signal strength of the probe requests 570a, and include this detected signal strength in a response message 572a. Upon receiving the response message 572a, the probe device 510 will extract the signal strength value from the response message 574a, and record this value in the fingerprinting database 582, along with its current location 574a.

The probe device 510 subsequently moves to a second location 574b. At the second location 574b, the probe device 510 transmits more probe requests 570*b*. These additional probe requests 570*b* are also received by the same access point 506. When calibrating using the access points' perspective, the access point 506 also detects the signal strength of these additional probe requests 570*b*, and includes this detected value with additional response messages 572*b*. Upon receiving the additional response messages 572*b*, the probe device 510 records an additional entry, this time for the second location 574*b*, in the fingerprinting database 582.

Probe requests may include an identifier to, for example, distinguish a probe request sent while the probe device 510 was at the first location 574*a* from a probe request 570*a* sent while the probe device 510 was at the second location 574*b*. Additionally, identifiers may distinguish between one or more probe requests sent from the same location. The response messages may include a probe request identifier to indicate which specific probe request the response message is for. Pairing probe requests with response messages is not, however, required, and adequate information may be acquired from as few as one response message.

Figure 6A:
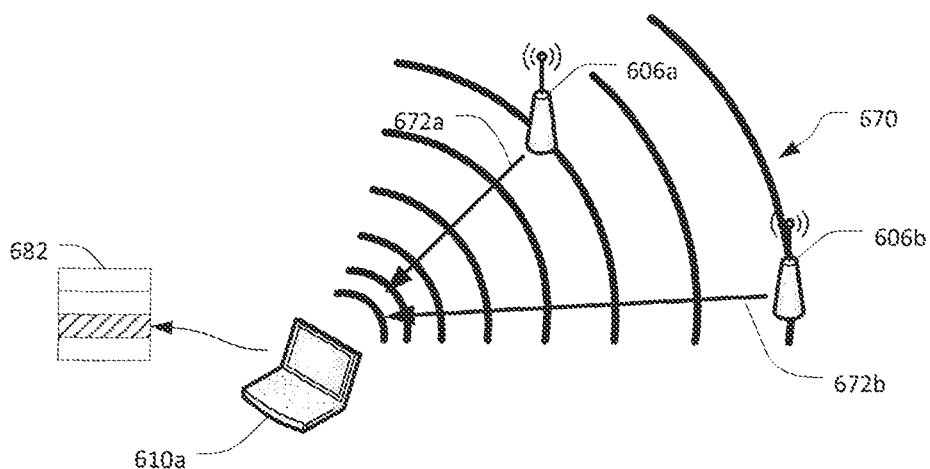
FIGS. 6A-6B illustrate examples of the positioning phase of fingerprinting.
Figure 6B:
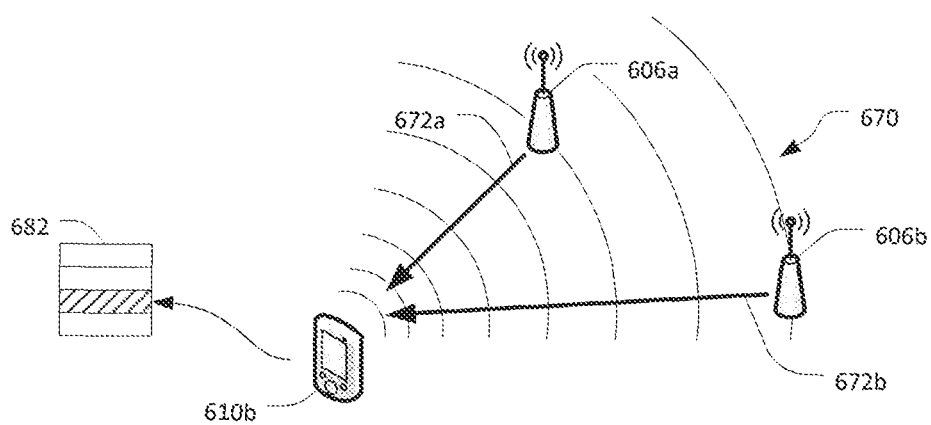

FIGS. 6A-6B illustrate examples of the positioning phase of fingerprinting, and illustrates some reasons why the fingerprinting calibration using the access points' perspective provides more accurate position information.

In the example of FIG. 6A, a larger client device, such as a laptop computer 610*a*, is requesting its position from a network that includes at least two access points 606*a*, 606*b*. As noted above, the laptop computer 610*a* may transmit one or more probe requests 670 to locate and identify available access points 606*a*, 606*b*. The laptop computer 610*a* may do so in order to join the network that the access points 606*a*, 606*b* are associated with. The access points 606*a*, 606*b* may each respond to the probe requests 670 with a response message 672*a*, 672*b* that includes the information the laptop device 610 may need to associate with either access point 606*a*, 606*b*. The access points 606*a*, 606*b* may also, for positioning purposes, detect the signal strength of the probe requests 670. The access points 606*a*, 606*b* and/or the network with which they are associated may use these detected signals strengths to determine a "best match" entry in a fingerprinting database 682. Best match means that the detected signal strengths are the same as or close to one or more entries in the fingerprinting database 682. These one or more entries may then be used to give an approximate position for the laptop computer 610*a*.

As a larger device, the laptop computer 610*a* may have larger and/or multiple antennas for communicating with the access points 606*a*, 606*b*. Larger and/or multiple antennas may be able to transmit strong signals. The access points 606*a*, 606*b* may thus detect strong received signal strengths for the probe requests 670 sent by the laptop device 610*a*. The detected signal strengths may be stronger than the signal strengths recorded in the fingerprinting database 682. If this is the case, the fingerprinting calibration using the access points' perspective may provide a more consistent and accurate position for the laptop device 610*a* than the conventional method. This is because, even though the signal strengths detected from the laptop device 610*a* may be stronger than the signal strengths recorded in the fingerprinting database 682, both the detected and stored signal strengths were determined by the access points 606*a*, 606*b*. Both access points 606*a*, 606*b* will therefore see approximately the same relative difference in the detected versus the stored signal strengths. For example and by way of illustration, the fingerprinting database 682 may have the recorded signal strengths of 6.3 and 4.9 for the access points 606*a*, 606*b*, respectively. Furthermore, access points 606*a*, 606*b* may have detected signal strengths of 8.3 and 6.9 for the probe requests 607 from the laptop device 610*a*. The network may be able to determine the relative difference in the detected versus stored signal strengths (2.0), adjust the detected signal strengths accordingly, and use the adjusted signal strengths to determine the laptop device's 610*a* position.

When the network is supplied with a fingerprinting database that was generated using the conventional method, the network may be able to make the same adjustment. The resulting position, however, may not be as consistent and/or accurate. This is because the network must attempt to determine the relative difference between signal strengths as seen from the access points 606*a*, 606*b* (the detected signal strengths) versus the signal strengths as seen from the probe device (the recorded signal strengths). This difference in point of view may introduce deviations that may not be present when both the detected and recorded signal strengths are seen from the same point of view, as is the case when calibrating using the access points' point of view. The conventional calibration method may therefore result in somewhat less accurate, and/or possibly less consistent, position information than when calibrating using the access points' point of view.

FIG. 6B illustrates an example of a smaller client device, such as a smart phone 610*b*, requesting its position from the network that includes the access points 606*a*, 606*b*. As in FIG. 6A, in FIG. 6B the smart phone 610*b* may transmit one or more probe requests 670 to locate nearby access points 606*a*, 606*b*. The access points 606*a*, 606*b* may respond with response messages 672*a*, 672*b* that include information the smart phone 610*b* may need to associate with either access point 606*a*, 606*b*. The access points 606*a*, 606*b* may also detect the received signal strength of the probe requests 670, and use the detected signal strengths to determine the position of the smart phone 610*b*, using the fingerprinting database 682.

In contrast to the laptop device 610*a*, the smart phone 610*b* may have smaller and/or fewer antennas than the laptop device 610*b*. The signal strengths detected for the probe requests 670 from the smart phone 610*b* may therefore be weaker. As with the laptop device 610*a*, the access points 606*a*, 606*b* will each see the same relative difference between the weaker, detected signal strengths and the signal strengths recorded in the fingerprinting database 682. The network may thus make a similar adjustment as for the laptop device 610*a* to determine the position of the smart phone 610*b*.

As illustrated by these examples, fingerprinting calibration using the access points' point of view may provide more accurate and/or consistent positioning information for client devices of all kinds. Fingerprinting calibration using the access points' point of view may provide a consistent view of received signal strength, and may thus remove deviations that may be introduced by relying on the signal strength as seen by the probe device.

IV. Computer System

Figure 7:
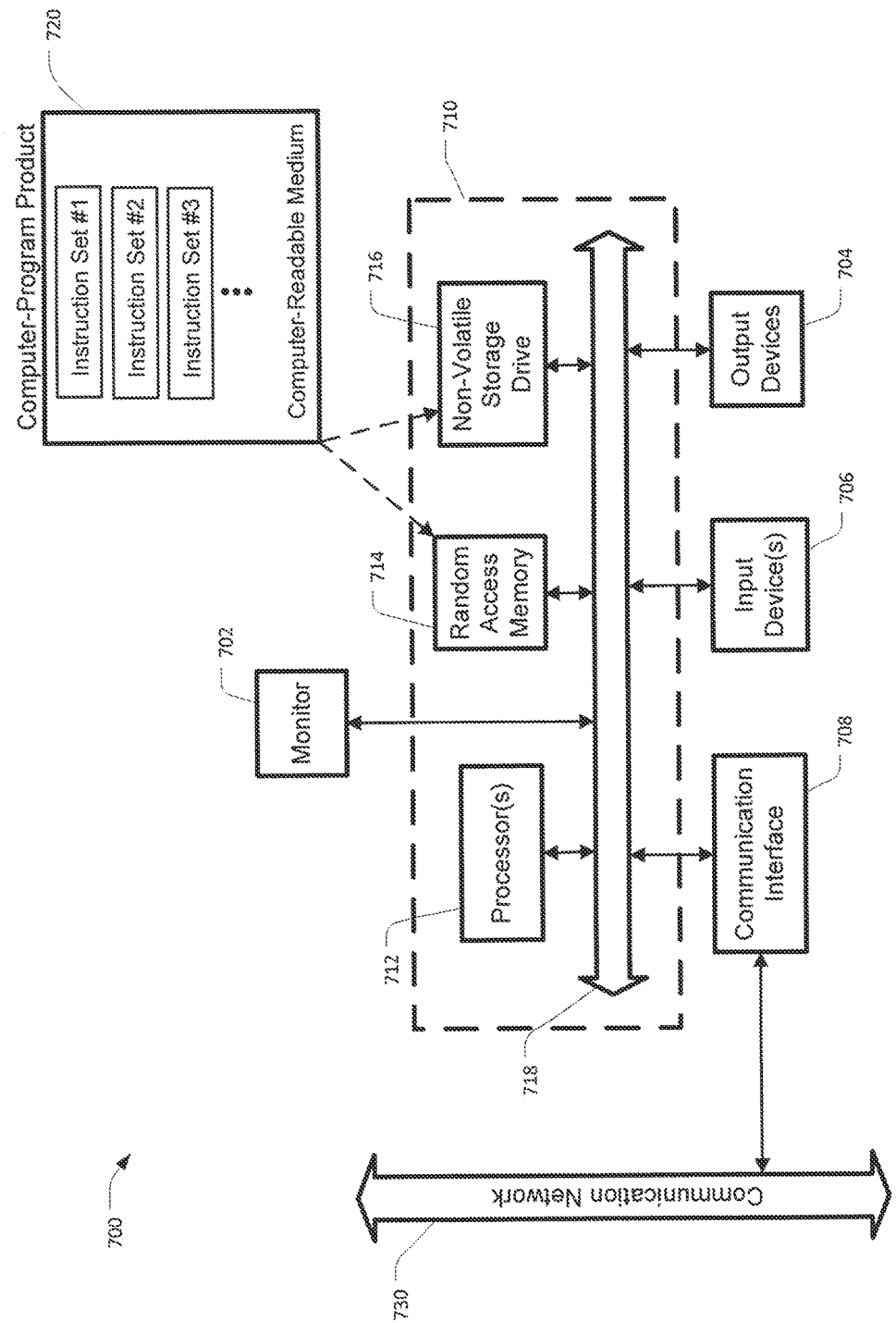
FIG. 7 illustrates an embodiment of a special-purpose computer system.

FIG. 7 illustrates an embodiment of a special-purpose computer system 700. The above methods may be implemented by computer-program products that direct a computer system to perform the actions of the above-described methods and components. Each such computer-program product may comprise sets of instructions (code or program code) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system, it operates as the special-purpose computer system 700.

The special-purpose computer system 700 comprises a computer 710, a monitor 702 coupled to the computer 710, one or more optional user output devices 704 coupled to the computer 710, one or more user input devices 706 (e.g., keyboard, mouse, track ball, touch screen) coupled to the computer 710, an optional communications interface 708 coupled to the computer 710, a computer-program product 720 stored in a tangible computer-readable memory in the computer 710. The computer-program product 720 directs the special-purpose computer system 700 to perform the above-described methods. The computer 710 may include one or more processors 712 that communicate with a number of peripheral devices via a bus subsystem 718. These peripheral devices may include the user output device(s) 704, user input device(s) 706, communications interface 708, and a storage subsystem, such as a random access memory (RAM) 714 and/or a non-volatile storage drive 716 (e.g., disk drive, optical drive, solid state drive), which are forms of tangible computer-readable memory.

The computer-program product 720 may be stored in the non-volatile storage drive 716 and/or another computer-readable medium accessible to the computer 710 and loaded into the memory 714. Each processor 712 may comprise a microprocessor, such as a microprocessor from Intel® or Advanced Micro Devices, Inc.®, or the like. To support the computer-program product 720, the computer 710 runs an operating system that handles the communications of the computer-program product 720 with the above-noted components, as well as the communications between the above-noted components in support of the computer-program product 720. Exemplary operating systems include Windows® or the like from Microsoft Corporation, Solaris® from Sun Microsystems, LINUX, UNIX, and the like.

The user input devices 706 include all possible types of devices and mechanisms to input information to the computer system 710. These may include a keyboard, a keypad, a mouse, a scanner, a digital drawing pad, a touch screen incorporated into the display, audio input devices such as voice recognition systems, microphones, and other types of input devices. In various embodiments, the user input devices 706 are typically embodied as a computer mouse, a trackball, a track pad, a joystick, wireless remote, a drawing tablet, a voice command system. The user input devices 706 typically allow a user to select objects, icons, text and the like that appear on the monitor 702 via a command such as a click of a button or the like. The user output devices 704 include all possible types of devices and mechanisms to output information from the computer 710. These may include a display (e.g., a monitor 702), printers, non-visual displays such as audio output devices, etc.

The communications interface 708 provides an interface to communication networks 730 and devices and may serve as an interface to receive data from and transmit data to other systems, WANs and/or the Internet. Embodiments of the communications interface 708 may be an Ethernet card, a modem, a cable modem, a router, a switch, an embedded multimedia adapter (EMTA), a synchronous or asynchronous digital subscriber line (DSL) unit, a FireWire® interface, a USB® interface, a wireless network adapter, and the like. For example, the communications interface 708 may be coupled to a computer network, to a FireWire® bus, or the like. In other embodiments, the communications interface 708 may be physically integrated on the motherboard of the computer 710, and/or may be a software program, or the like.

The RAM 714 and non-volatile storage drive 716 are examples of tangible computer-readable media configured to store data such as computer-program product embodiments of the systems and methods described herein, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. The RAM 714 and non-volatile storage drive 716 may be configured to store the basic programming and data constructs that provide the functionality of various embodiments of the systems and methods described above.

Software instruction sets that provide the functionality of the described methods may be stored in the RAM 714 and/or non-volatile storage drive 716. These instruction sets or code may be executed by the processor(s) 712. The RAM 714 and/or non-volatile storage drive 716 may also provide a repository to store data and data structures used in accordance with the disclosed systems and methods. The RAM 714 and non-volatile storage drive 716 may include a number of memories including a main random access memory (RAM) to store instructions and data during program execution and a read-only memory (ROM) in which fixed instructions are stored. The RAM 714 and non-volatile storage drive 716 may include a file storage subsystem providing persistent (non-volatile) storage of program and/or data files. The RAM 714 and non-volatile storage drive 716 may also include removable storage systems, such as removable flash memory.

The bus subsystem 718 provides a mechanism to allow the various components and subsystems of the computer 710 to communicate with each other as intended. Although the bus subsystem 718 is shown schematically as a single bus, alternative embodiments of the bus subsystem 718 may implement multiple busses or communication paths within the computer 710.

The preceding description provides example embodiments only, and is not intended to limit the scope, applicability, or configuration of the disclosure. Rather, the preceding description of the example embodiments will provide those skilled in the art with an enabling description for implementing an example embodiment. It should be understood that various changes may be made in the function and arrangement of elements without departing from the spirit and scope of the systems and methods as set forth in the appended claims.

Specific details are given in the preceding description to provide a thorough understanding of the embodiments. It will be understood, however, by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive.

It is also noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the various systems and methods are described with reference to specific embodiments thereof, but those skilled in the art will recognize that the disclosed systems and methods are not limited thereto. Various features and aspects of the above-described systems and methods may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A method for wireless network signals, comprising:
   receiving, at a first access point, a first wireless probe request sent from a probe device when located at a first probe device location;
   detecting, at the first access point, a first probe device signal strength of the first wireless probe request when located at the first probe device location;
   responding, via the first access point, to the first wireless probe request with a first response message that includes the detected first probe device signal strength of the first wireless probe request to generate an entry of the detected first probe device signal strength of the first wireless probe request at the first access point when located at the first probe device location in a fingerprinting database;
   receiving, at a second access point, a second wireless probe request sent from the probe device when located at a second probe device location;
   detecting, at the second access point, a second probe device signal strength of the second wireless probe request when located at the second probe device location;
   responding, via the second access point, to the second wireless probe request with a second response message that includes the detected second probe device signal strength of the second wireless probe request to generate an entry of the detected second probe device signal strength of the second wireless probe request at the second access point when located at the second probe device location in the fingerprinting database;
   receiving, at the first access point and the second access point, a mobile device wireless probe request sent from a mobile device when located at a mobile device location;
   detecting, at the first access point, a first mobile device signal strength of the mobile device wireless probe request from the mobile device location;
   detecting, at the second access point, a second mobile device signal strength of the mobile device wireless probe request from the mobile device location; and
   determining the mobile device location by correlating the detected first and second mobile device signal strengths of the mobile device wireless probe request to the entries of the detected first and second probe device signal strengths in the fingerprinting database of the respective first wireless probe request and the second wireless probe request.

2. The method of claim 1, wherein determining the mobile device location comprises determining the mobile device location with respect to the first probe device location and the second probe device location.

3. The method of claim 1, wherein the probe device generates a signal strength different from a signal strength generated by the mobile device.

4. The method of claim 3, further comprising determining that a difference between the first probe device signal strength and the first mobile device signal strength approximates a difference between the second probe device signal strength and the second mobile device signal strength.

5. The method of claim 1, wherein the first probe device location, the second probe device location, and the mobile device location are indoor locations.

6. The method of claim 1, further comprising determining the first probe device signal strength and the second probe device signal strength by querying the fingerprinting database that is populated by the probe device.

7. The method of claim 1, wherein:
   the first response message includes an identifier of the first access point; and
   the second response message includes an identifier of the second access point.

8. The method of claim 1, wherein the first response message to the first wireless probe request is received when the probe device is located at a location different from the first probe device location, and wherein the first response message comprises an identifier of the first access point.

9. An apparatus for network deployment, comprising:
   a processing resource; and
   a memory resource storing machine-readable instructions to cause the processing resource to:
   detect, at a first access point, a first probe device signal strength of a received first wireless probe request from a probe device when located at a first probe device location;
   respond, via the first access point, to the first wireless probe request with a first response message that includes the detected first probe device signal strength of the first wireless probe request to generate an entry of the detected first probe device signal strength of the first wireless probe request at the first access point when located at the first probe device location in a fingerprinting database;
   detect, at a second access point, a second probe device signal strength of a received second wireless probe request from the probe device when located at a second probe device location;

respond, via the second access point, to the second wireless probe request with a second response message that includes the detected second probe device signal strength of the second wireless probe request to generate an entry of the detected second probe device signal strength of the second wireless probe request at the second access point when located at the second probe device location in the fingerprinting database;

receive, at the first access point and the second access point, a mobile device wireless probe request sent from a mobile device when located at a mobile device location;

detect, at the first access point, a first mobile device signal strength of the mobile device wireless probe request from the mobile device location;

detect, at the second access point, a second mobile device signal strength of the mobile device wireless probe request from the mobile device location; and determine the mobile device location by correlating the detected first and second mobile device signal strengths of the mobile device wireless probe request to the entries of the detected first and second probe device signal strengths in the fingerprinting database of the respective first wireless probe request and the second wireless probe request.

10. The apparatus of claim 9, wherein the machine-readable instructions further cause the processing resource to determine that a difference between the first probe device signal strength and the first mobile device signal strength approximates a difference between the second probe device signal strength and the second mobile device signal strength.

11. The apparatus of claim 9, wherein determining the mobile device location comprises determining the mobile device location with respect to the first probe device location and the second probe device location.

12. The apparatus of claim 9, wherein the first probe device location, the second probe device location, and the mobile device location are indoor locations.

13. The apparatus of claim 9, wherein the machine-readable instructions further cause the processing resource to determine the first probe device signal strength and the second probe device signal strength by querying the fingerprinting database.

14. The apparatus of claim 9, wherein:
the first response message includes an identifier of the first access point; and
the second response message includes an identifier of the second access point.

15. The apparatus of claim 9, wherein the first response message to the first wireless probe request is received when the probe device is located at a location different from the first probe device location, and wherein the first response message comprises an identifier of the first access point.

16. A non-transitory computer-readable medium storing instructions executable by a processor to cause the processor to:
detect, at a first access point, a first probe device signal strength of a received first wireless probe request from a probe device when located at a first probe device location;

respond, via the first access point, to the first wireless probe request with a first response message that includes the detected first probe device signal strength of the first wireless probe request to generate an entry of the detected first probe device signal strength of the first wireless probe request at the first access point when located at the first probe device location in a fingerprinting database;

detect, at a second access point, a second probe device signal strength of a received second wireless probe request from the probe device when located at a second probe device location;

respond, via the second access point, to the second wireless probe request with a second response message that includes the detected second probe device signal strength of the second wireless probe request to generate an entry of the detected second probe device signal strength of the second wireless probe request at the second access point when located at the second probe device location in the fingerprinting database;

receive, at the first access point and the second access point, a mobile device wireless probe request sent from a mobile device when located at a mobile device location;

detect, at the first access point, a first mobile device signal strength of the mobile device wireless probe request from the mobile device location;

detect, at the second access point, a second mobile device signal strength of the mobile device wireless probe request from the mobile device location; and determine the mobile device location by correlating the detected first and second mobile device signal strengths of the mobile device wireless probe request to the entries of the detected first and second probe device signal strengths in the fingerprinting database of the respective first wireless probe request and the second wireless probe request.

17. The non-transitory computer-readable medium of claim 16, wherein the first probe device location, the second probe device location, and the mobile device location are indoor locations.

18. The non-transitory computer-readable medium of claim 16, wherein the instructions further cause the processor to determine the first probe device signal strength and the second probe device signal strength by querying the fingerprinting database.

19. The non-transitory computer-readable medium of claim 18, wherein:
the first response message includes an identifier of the first access point; and
the second response message includes an identifier of the second access point.

20. The non-transitory computer-readable medium of claim 16, wherein the first response message to the first wireless probe request is received when the probe device is located at a location different from the first probe device location, and wherein the first response message comprises an identifier of the first access point.

* * * * *